United States Patent [19]
Lauterbach

[11] 3,922,132
[45] Nov. 25, 1975

[54] FLEXIBLE SEAL FOR BRIQUETTE MACHINE

[75] Inventor: William L. Lauterbach, Upper St. Clair Township, Allegheny County, Pa.

[73] Assignee: United States Steel Corporation, Pittsburgh, Pa.

[22] Filed: May 6, 1974

[21] Appl. No.: 467,527

[52] U.S. Cl. .................. 425/237; 425/363; 277/15
[51] Int. Cl.² ......................................... B29C 15/00
[58] Field of Search ............ 425/75, 237, 335, 363; 227/15, 70, DIG. 5, 237

[56] References Cited
UNITED STATES PATENTS

| | | | |
|---|---|---|---|
| 2,161,356 | 6/1939 | Jewett | 425/75 |
| 2,663,901 | 12/1953 | Hale et al. | 425/310 X |
| 2,959,133 | 11/1960 | Erwin | 277/15 X |
| 3,193,377 | 7/1965 | Guseman et al. | 425/237 X |
| 3,650,582 | 3/1972 | Casey | 277/15 X |
| 3,741,702 | 6/1973 | Mazzoni | 425/363 X |

Primary Examiner—Robert L. Spicer, Jr.
Attorney, Agent, or Firm—William L. Krayer

[57] ABSTRACT

A device is disclosed for effecting a seal between a mold roll and the housing of a tandem roll briquette making machine. The seal yields on contact with briquettes or parts thereof stuck in the molds and returns to its original position thus maintaining the sealing engagement rather than permitting damage.

8 Claims, 4 Drawing Figures

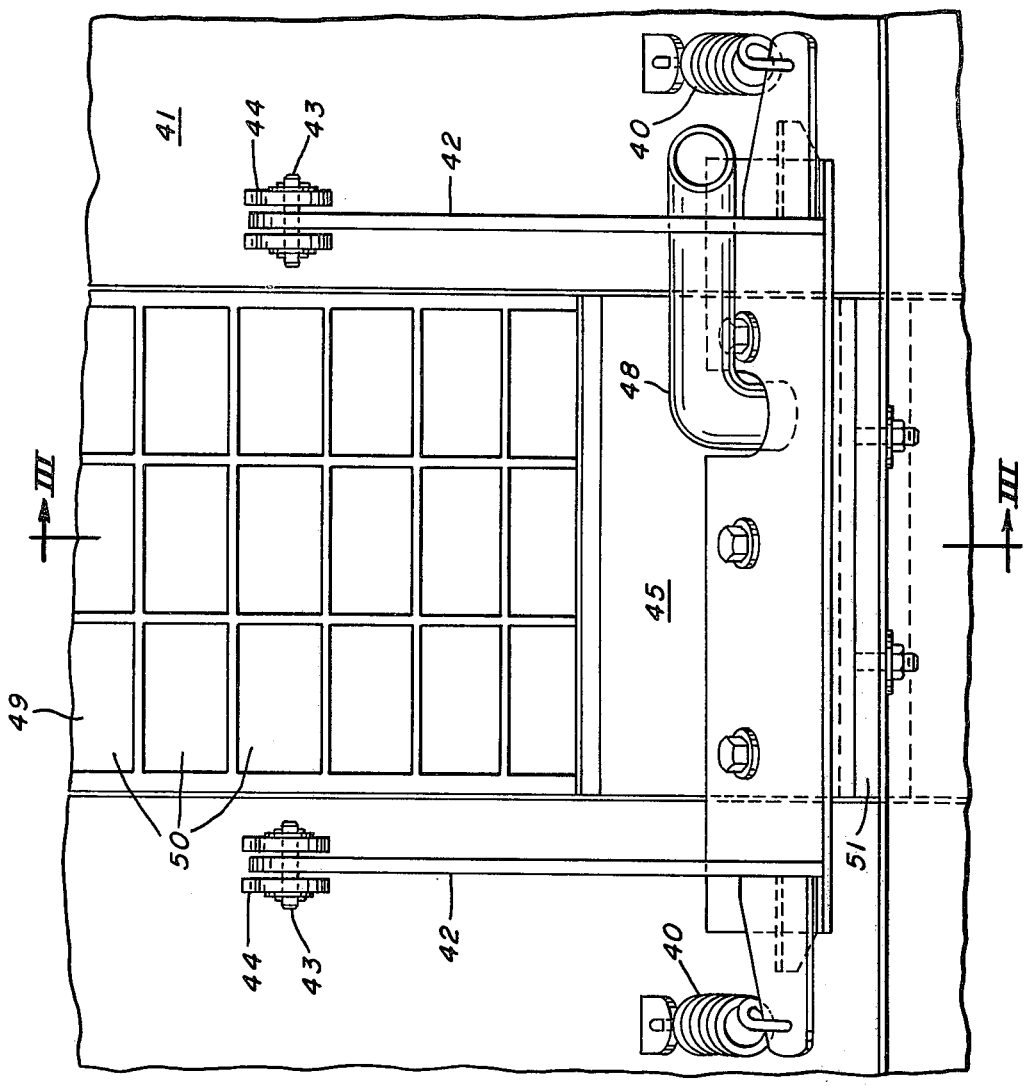
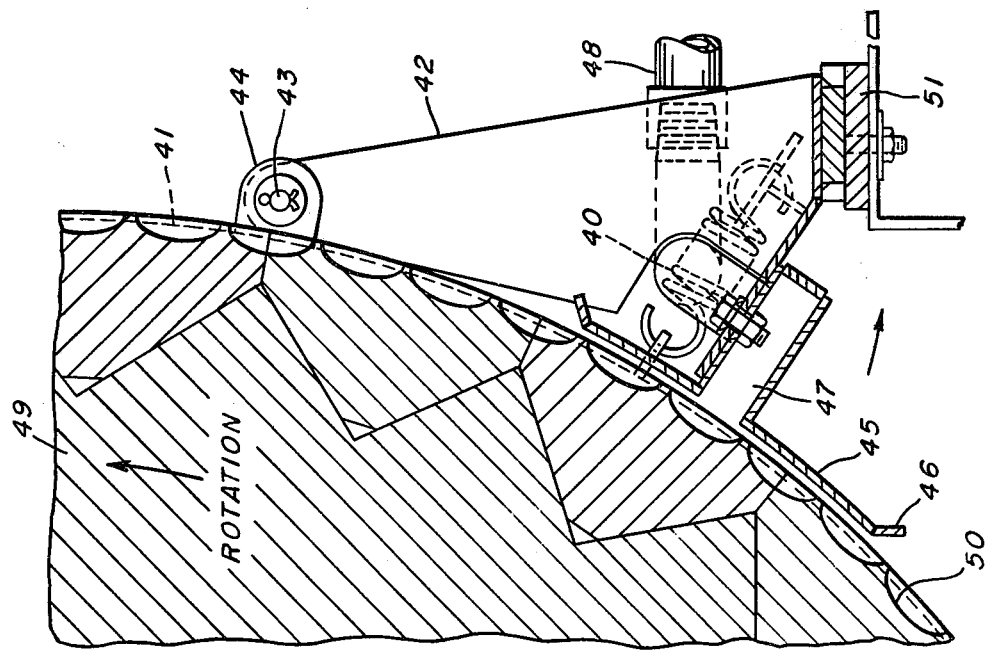

FLEXIBLE SEAL FOR BRIQUETTE MACHINE

BACKGROUND OF THE INVENTION

This invention relates to the construction of briquette mold machines to be used under severe conditions of temperature and abrasion. In particular it relates to briquette machines of the general type disclosed in Komarek U.S. Pat. No. 3,077,634, as modified in the disclosure of Paul B. Anthony, Ser. No. 374,456, filed June 28, 1973.

Komarek shows a briquetting machine characterized by a cylindrical central body having V-shaped recesses for accommodating mold inserts. These cylindrical units are placed in tandem so that faces of two molds oppose each other as the cylinders turn, compressing the particulate material which falls between them. Temperatures of the gas are about 1100°–1400°F. Because of the large quantity of dust which is generated inside the hopper leading to the compressing zone, it has been necessary to seal off the entire machine from the atmosphere in order to prevent explosions. The large opaque housing, however, has rendered it difficult to cool the machine with water sprays and impossible to see the mold inserts for inspection; moreover, it has not been entirely free from the hazards of combustion.

The principal object of Anthony's invention is to provide a means of permitting the periphery of the briquetting roll to rotate from the inside sealed portion of the machine to an exposed outside unsealed portion of the machine, with a seal or barrier between the inside and outside portions of the machine that does not contact the rotating roll. The reasons for not having contact between the rotating roll and the stationary housing are (a) there may be uneven surfaces on the roll of up to 0.010 inch, (b) differences in roll dimensions of up to 0.060 inch due to expansion during operating temperature changes, and (c) movement of the briquetting roll axial position up to 1 inch by reason of operating adjustments or alignments. Benefits of the Anthony invention include longer roll life, a reduction of "stickers" in the roll pockets, and operator ability to see problems develop on the roll face before they become serious.

The Anthony disclosure includes a method of inhibiting the contact of combustible dust-laden gas inside a briquetting machine with entering external oxygen-rich atmosphere comprising flowing inert gas into passages leading from the inside of said machine to the external atmosphere to effect flow of said inert gas both into said machine and external of said machine.

It includes a briquette machine comprising two revolving cylindrical rolls for compressing particulate matter in mold inserts, a housing therefor, and means for providing a view of empty mold inserts while sealing gases inside the machine, comprising an opening in said housing having a sealing edge when heated from 0.01–0.03 inch away from the roll, and means for flowing inert gas into the seal thereof through the edge of the housing to effect flow of inert gas into and out of said machine. However, it has been found that, if briquettes become stuck, i.e. partially welded, in the mold faces on the rolls, they will usually protrude and damage the face of the seal as the roll moves through the housing and into the rather close tolerance of the sealing edge. A bent or damaged edge will cause a serious leak of the inert gas and render the seal less effective than it would be otherwise.

SUMMARY OF THE INVENTION

My invention provides a yieldable and returnable seal edge responsive to an object in moving contact with it so that, rather than inflicting permanent damage on the seal, the object may move through the seal and leave it undamaged. The invention will be discussed with reference to a preferred embodiment illustrated in the attached drawings.

FIG. 2 is a detailed view of the seal of the invention, showing the rotation of the face of the mold rolls.

FIG. 3 shows the seal of FIG. 2.

Figure 1:
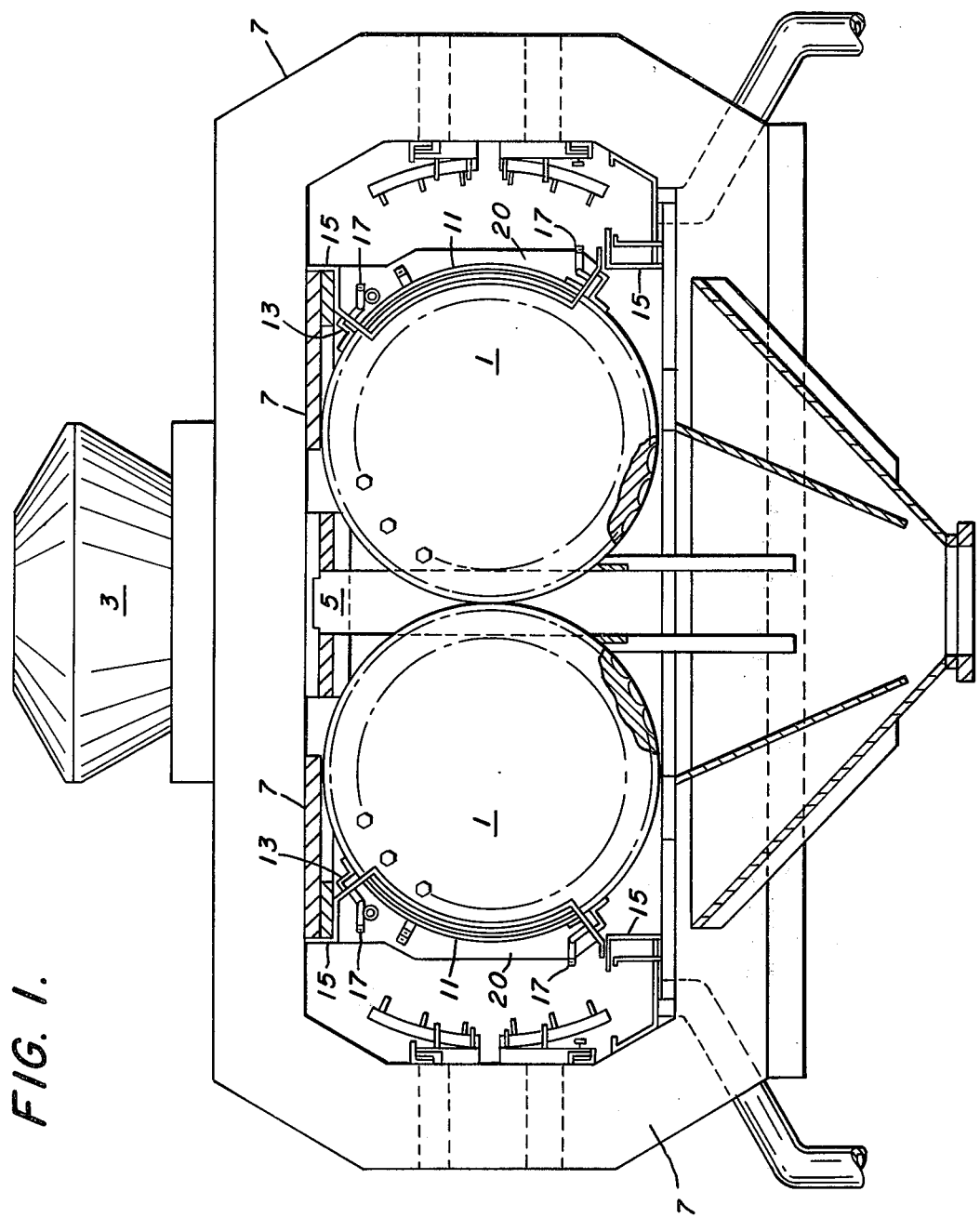
FIG. 1 is a more or less diagrammatic side sectional view of a briquette mold machine having an inert gas sealing system.

In FIG. 1, a side sectional view of a briquette machine modified according to Anthony U.S. patent application Ser. No. 374,456, two adjacent axially parallel briquette mold rolls 1 are shown in position for compressing and molding particulate material (not shown) fed from hopper 3 through chute 5. Both rolls are housed in a case or cover 7. The sealing mechanism is made up of side radial seals 11, end roll face seals 13, housing seals 15, and inert gas piping 17 to the radial 11 and end 13 seals.

Left- and right-hand side radial seals 11 are firmly attached on their outside ends to the machine bearing blocks 20. The inside ends of radial seals 11 are in maximum proximity 0.010 inch to 0.030 inch to the sides of the rotating briquetting roll 1 when the machine is cold and also when it is hot and in its most expanded state, since both the roll and seal expand outwardly.

Top and bottom end roll face seals 13 are firmly attached to the left- and right-hand side radial seals and are approximately 0.07 inch to 0.09 inch from the briquette roll face when the machine is cold; when it is hot, the expansion closes the seal to about 0.01 inch to 0.03 inch.

From the perspective of FIG. 1, the housing seals 15 are firmly attached to the side radial seals 11 and the end roll face seals 13, and are placed against the machine housing 7 and machine bearing blocks 20, allowing for relative operating movement between the "roll-bearing block-seal" assembly and the housing, and temperature-caused expansion movement between the roll and the seal parts as well as the "bearing block-seal" assembly and the roll. Seal spacing throughout the machine while hot and operating is maintained at about 0.01 inch to 0.03 inch.

FIG. 2 illustrates in detail the position of my seal facing the working dimension or periphery of the roll, i.e. the roll face seals 13 of FIG. 1. In this improvement, a spring 40 is attached to side seal 41 and also to the hinge bracket 42, which in turn may rotate on hinge 43 anchored to the side seal at 44. To bracket 42 is affixed a seal edge 45 having a lip 46 at a slight angle, i.e. 10°–75°, preferably 45° as shown, from the seal edge 45. The sealing edge 45 (or alternatively any other part of the seal or bracket) rests on rest 51 at the desired tolerance from the roll face. Also illustrated is a port 47 for inert gas to be introduced through hose or other flexible connection 48. The mold roll 49, shown rotating in an upward or counterclockwise direction as it would be positioned on the lower right side of FIG. 1, contains concave mold shapes 50 whose most protruding parts are within the tolerance set to normally avoid hitting the seal edge 45.

Figure 4:
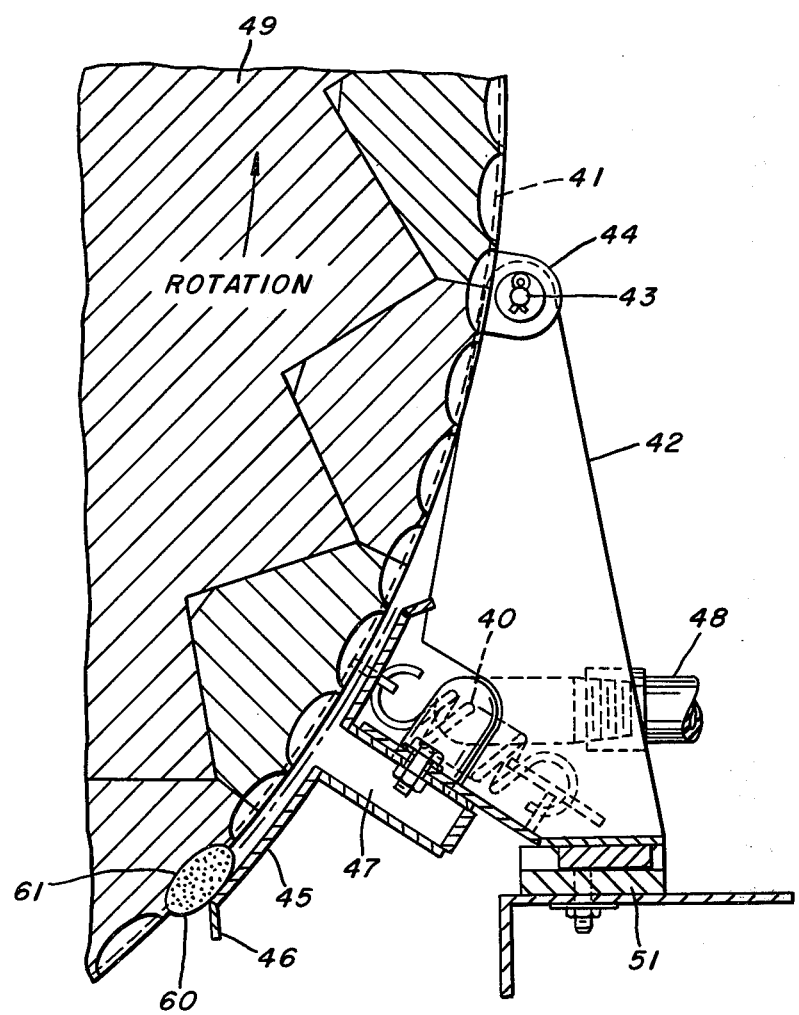
FIG. 4 shows a seal in extended position.

The same seal may be seen in FIG. 3 and in FIG. 4 after it has been temporarily moved on its hinge 43 by the protruding briquette 60 stuck in mold pocket 61. The edge obviously will be undamaged by the passage of the briquette; not only will the seal be preserved permanently, thus avoiding the risk of combustion in the machine, but only a minute amount of inert gas will be lost while the seal is temporarily out of place. Thus, it may be seen that my invention is a sealing device for the housing of a briquette machine having mold rolls and at least one housing opening, comprising a sealing element substantially parallel with the face of the mold roll (i.e. tangent to the mold roll), a lip entry element thereon at an angle thereto of 10°–75°, and a spring element for returning the sealing element to its original position after displacement thereof.

My invention is not limited to the above specific illustrations, but may be otherwise variously practiced within the scope of the following claims.

I claim:

1. A gas sealing device for the housing of a briquette machine having mold rolls and at least one housing opening, for separating gas in the housing from the external atmosphere, comprising a sealing element mounted substantially parallel with the face of the mold roll, a lip entry element thereon and at an angle thereto, a hinge on said sealing element and anchored at a point removed from said lip entry element, whereby a protrusion moving with the face of the mold roll will cause a displacement of said sealing element about said hinge by striking said lip entry element, and a spring element for returning the sealing element to its original position after displacement thereof.

2. Sealing device of claim 1 in which the lip entry element faces the mold roll in a direction opposite its normal rotation at an angle of from about 10° to about 75° from the plane of the sealing element.

3. Sealing device of claim 1 including a port for delivering inert gas to the seal opening and a flexible hose connected thereto.

4. Sealing device of claim 1 including means for adjustably setting a seal tolerance and arresting the movement of the seal toward the roll as urged by the spring means.

5. A tandem roll briquette machine comprising two mold rolls having peripheral mating mold pockets, a housing therefor including inert gas sealing means, and the sealing device of claim 1.

6. The machine of claim 5 in which the sealing device has a lip angle of about 10° to about 75°.

7. A tandem roll briquette machine including two mold rolls having peripheral mating mold pockets, a housing therefor in close relationship with the mold rolls, and spring-actuated sealing means in close relationship with the faces of the mold pockets for effecting a seal between the external atmosphere and a gaseous atmosphere within said housing, said sealing means being spring yieldable when struck by a briquette protrusion on a mold roll, and returnable to its original position.

8. Machine of claim 7 in which the sealing means includes a lip at an angle of about 10° to about 75° to the tangent of the faces of the mold roll.

* * * * *